Patented Feb. 21, 1933

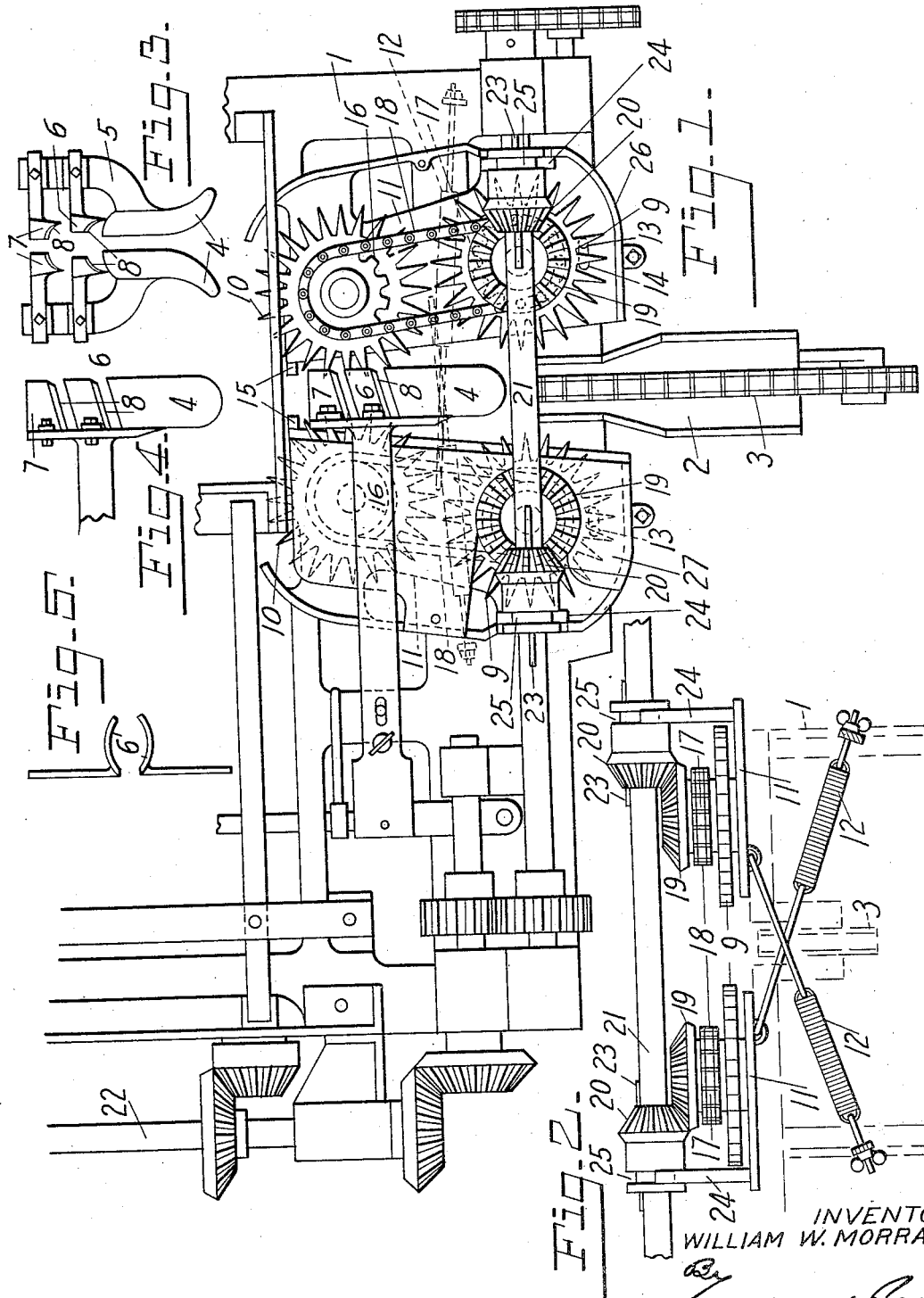

1,898,592

UNITED STATES PATENT OFFICE

WILLIAM W. MORRAL, OF MORRAL, OHIO, ASSIGNOR OF ONE-HALF TO SAMUEL E. MORRAL, OF MORRAL, OHIO

CORN CUTTING MACHINE

Application filed March 5, 1928, Serial No. 259,007. Renewed December 27, 1930.

This invention relates to a corn cutting machine and is designed more particularly for cutting green corn from the cob.

One object of the invention is to provide a corn cutting machine which is very simple in construction and in which the ear feeding devices will automatically accommodate themselves to ears of different sizes and will be maintained at all times in proper feeding relation to the ear, making a very positive feed.

A further object of the invention is to provide such a machine in which the driving mechanism for the ear feeding devices will be so arranged that fragments of corn and juices from the ears will not come in contact therewith and become discolored and then find their way into the corn which has been cut from the cob; and in which the fragments and juices will not accumulate on the driving mechanism so as to interfere with its proper operation.

A further object of the invention is to provide in such a machine cutters of such a character that they will quickly and cleanly cut the grains of corn from the cob without crushing or tearing the grains.

Other objects of the invention will appear as the mechanism is described in detail.

In the accompanying drawing Fig. 1 is a top plan view of a portion of a corn cutting machine showing my invention applied thereto, with one of the cover plates removed; Fig. 2 is an end elevation of the feeding mechanism; Fig. 3 is a side elevation of the guides and cutters; Fig. 4 is a plan view of the guides and cutters; and Fig. 5 is an end elevation of one pair of cutters.

In this drawing I have illustrated one embodiment of my invention and have shown the same as applied to a cutting machine of the type shown in the patent to Morral & Morral, Numbered 975,631 of November 15, 1910, but it will be understood that this particular embodiment has been chosen for the purposes of illustration only and that the mechanism may take various forms without departing from the spirit of the invention.

In the particular embodiment here illustrated the machine comprises a main frame 1 having a substantially horizontal upper portion, the intermediate portion 2 of which constitutes a guideway to which ears of corn to be cut are delivered lengthwise by a conveyor 3. Arranged in line with the conveyor 3, adapted to receive the ears therefrom and constituting a part of the guideway, is a pair of guides 4 arranged one above the other, curved about longitudinal axes to receive the ear between them and having their forward ends flared to facilitate the entrance of the ears. Arranged beyond the guides 4 and, in the present instance, mounted upon the brackets 5 which support the respective guides, are two pairs of cutters 6 and 7, the cutters of each pair being arranged one above the other and curved about longitudinal axes to conform them somewhat to the shape of the ear and having their cutting edges 8 arranged obliquely to the line of movement of the ear so as to engage the grains of corn with a shearing cut and sever the grains without crushing or tearing the same. The second pair of cutters 7 are spaced apart a distance less than the distance between the cutters of the first pair so that the first pair of cutters will sever the grains between the ends thereof and the second pair of cutters will cut the grains close to the cob. The cutters here shown are arranged above and below the ear and will remove the major portion of the grains, additional cutters being provided beyond the cutter 7 to remove those grains at the sides of the ears which are not removed by the cutters here illustrated, as shown in the above mentioned patent. Inasmuch as these additional cutters form no part of the present invention they have not been here illustrated.

The ears of corn which are delivered to the guideway by the conveyor 3 are engaged by feeding devices arranged on opposite sides of the guideway and of such a character that they will move the ear lengthwise through the guideway and past the cutters. Preferably there is a set of rotatable feeding members on each side of the guideway, the corresponding feeding members of the two sets cooperating to advance the ears. In the present instance, each set of feeding members comprises a pair of spur wheels 9 and 10, the spur wheels 9 of the two pairs being spaced slightly farther apart than the spur wheels 10 so that the latter spur wheels will maintain a firm feeding engagement with the ear as the grains are removed therefrom. It will be noted that the teeth of the spur wheels 10 will pass between the edges of the upper and lower cutters. Each pair of spur wheels is mounted for movement toward and from the guideway to permit the feeding mechanism to accommodate itself to ears of different diameters. The arrangement and manner of supporting the feeding devices are such that they will be maintained in proper cooperative relation in all positions thereof. As here shown, each pair of spur wheels is mounted on a supporting structure or plate 11 supported upon the horizontal portion of the main frame and bodily movable toward and from the guideway, the several spur wheels being rotatable about individual vertical axes. Springs 12 are connected at one end with the respective plates 11 and at the other end with the main frame, as shown in Fig. 2, and resist the movement of the plates, and consequently of the spur wheels, away from the guideway, thus causing the teeth of the spur wheels to be pressed into firm engagement with the ears of corn. The movement of the plates 11 toward the guideway is limited at the forward ends of the plates by pins 13 carried by the main frame and extending through slots 14 in the respective plates. At their rear ends lugs 15 project from the main frame into the path of the plates. This mounting of the supporting members not only permits of the bodily movement thereof but also permits each end of each supporting member to have a limited swinging movement with relation to the other end of that supporting member, thus enabling the corresponding spur wheels on the two plates to be adjusted toward and from each other independently of the other spur wheels. The pins 13 and slot 14 in addition to limiting the movement of the front ends of the supporting members also constitute adjustable bearings about which the supporting plate may swing. The adjustment of the supporting members is, in the present machine, automatically controlled by the springs 12 but obviously it could be otherwise controlled in such a manner as to accommodate the space between the spur wheels to the size of the ears.

The spur wheels of each pair have driving connection one with the other and, in the present construction, sprocket wheels 16 and 17 are secured to the respective spur wheels and arranged above the spur wheels, the two sprocket wheels being connected by a sprocket chain 18. Rigidly secured to each of the forward spur wheels 9, above the sprocket wheels 17, is a beveled gear 19 with which mesh beveled pinions 20 carried by a driving shaft 21 which extends transversely to the feeding mechanism, above the same, and is connected through suitable gearing with the main shaft 22. In the present construction the spur wheel 9, sprocket wheel 17 and beveled gear 19 are rigidly connected one to the other as a unit and this unit is rotatably mounted on a non-rotatable shaft carried by the plate 11. The pinions 20 are mounted on the shaft 21 for axial movement with relation thereto but are held against rotation with relation to that shaft, the pinions being preferably splined to the shaft, as shown at 23, thus permitting the pinions to move with the feeding devices as the latter move to accommodate themselves to ears of different sizes. As here shown, each plate 11 has rigidly secured thereto a yoke 24 which engages a groove 25 in the hub of the adjacent pinion 20, thus positively connecting the pinions with the plates and maintaining the pinions in mesh with the respective gears 19 in all positions of the latter. The plates 11 are provided with upwardly extending walls or flanges 26 to which are secured cover plates 27, thus forming housings to enclose the feeding mechanism. As shown in Fig. 1, the cover plate for the right hand housing has been removed.

With this mechanism the ears are delivered one at a time to the feeding devices which will move toward and from the guideway to accommodate themselves to ears of different sizes but will be retained in their proper positions with relation to the ears acted upon, this being due to the bodily movement of the supporting structures or plates 11 which carry the spur wheels. Because of the arrangement of the sprocket wheels and chains above the spur wheels little if any of the juices and fragments of corn removed from the ears by the spur wheels will come in contact with the chains or sprockets or any other part of the driving mechanism, thereby avoiding the discoloration of the fragments by contact with the feeding mechanism, and also preventing the fragments and juices from accumulating on the feeding mechanism and interfering with its operation;

While I have shown and described one embodiment of my invention I wish it to be understood that I do not desire to be limited to the details therefor as various modifications may occur to a person skilled in the art.

Having now fully described my invention, what I claim as new and desire to secure by Letters Patent, is:

1. In a corn cutting machine comprising a guideway, cutters arranged to engage an ear of corn in said guideway, a set of feeding devices on each side of said guideway to advance said ear of corn through said guideway and past said cutters and means for actuating said feeding devices, a separate supporting structure for each set of feeding devices mounted for bodily movement toward and from said guideway, and means to yieldably resist the movement of said supporting structures from said guideway.

2. In a corn cutting machine comprising a guideway, cutters arranged to engage an ear of corn in said guideway, a set of feeding devices on each side of said guideway to advance said ear of corn through said guideway and past said cutters and means for actuating said feeding devices, separate supporting plates on which the feeding devices of the respective sets are mounted, said plates being movable bodily toward and from said guideway, and springs acting on said plates to resist their movement from said guideway.

3. In a corn cutting machine comprising a guideway, cutters arranged to engage an ear of corn in said guideway, a set of feeding devices on each side of said guideway to advance said ear of corn through said guideway and past said cutters and means for actuating said feeding devices, a separate supporting structure for each set of feeding devices mounted for bodily movement toward and from said guideway, means to yieldably resist the movement of said supporting structure from said guideway, and means to limit the movement of said supporting structures with relation to said guideway.

4. In a corn cutting machine comprising a guideway, cutters arranged to engage an ear of corn in said guideway, a set of feeding devices on each side of said guideway to advance said ear of corn through said guideway and past said cutters and driving connections between the feeding devices of the respective sets, a separate, movable supporting structure for each set of feeding devices arranged to move both feeding devices of that set toward and from said guideway, and driving mechanism for said sets of feedings devices, said driving mechanism comprising parts movable with the respective supporting structures to maintain driving connection with said feeding devices in all positions of said supporting structures.

5. In a corn cutting machine comprising a guideway, cutters arranged to engage an ear of corn in said guideway, a set of feeding devices on each side of said guideway to advance said ear of corn through said guideway and past said cutters and driving connections between the feeding devices of the respective sets, a separate, movable supporting structure for each set of feeding devices arranged to move both feeding devices of that set toward and from said guideway, gears connected with the respective sets of feedings devices, a shaft, and gears mounted on said shaft and meshing with the respective first mentioned gears, the last mentioned gears being mounted for axial movement on said shaft and held against rotation with relation to said shaft.

6. In a corn cutting machine comprising a guideway, cutters arranged to engage an ear of corn in said guideway, a set of feeding devices on each side of said guideway to advance said ear of corn through said guideway and past said cutters and driving connections between the feeding devices of the respective sets, a separate, movable supporting structure for each set of feeding devices arranged to move both feeding devices of that set toward and from said guideway, gears connected with the respective sets of feeding devices, a shaft, gears mounted on said shaft and meshing with the respective first mentioned gears, the last mentioned gears being mounted for axial movement on said shaft and held against rotation with relation to said shaft, and means for connecting said last mentioned gears with the respective supporting structures to cause them to move therewith.

7. In a corn cutting machine comprising a guideway and cutters arranged to engage an ear of corn in said guideway, plates arranged on opposite sides of said guideway, extending lengthwise thereof and movable bodily toward and from said guideway, a plurality of spur wheels mounted on each plate, driving connections between the spur wheels on each plate, a gear connected with one spur wheel on each plate, a shaft, and gears splined in said shaft and meshing with the respective first mentioned gears.

8. In a corn cutting machine comprising a guideway and cutters arranged to engage an ear of corn in said guideway, plates arranged on opposite sides of said guideway, extending lengthwise thereof and movable bodily toward and from said guideway, a plurality of spur wheels mounted on each plate, driving connections between the spur wheels on each plate, a gear connected with one spur wheel on each plate, a shaft, gears splined on said shaft and meshing with the respective first mentioned gears, and devices mounted on the respective plates and connected with the respective last mentioned gears to cause the latter to move with the respective plates.

9. In a corn cutting machine comprising a guideway and cutters arranged to engage an ear of corn in said guideway, plates arranged on opposite sides of said guideway, extending lengthwise thereof and movable bodily toward and from said guideway, a plurality of spur wheels mounted on each plate, driving connections between the spur wheels on each plate, a gear connected with one spur wheel on each plate, a shaft, gears splined on said shaft and meshing with the respective first mentioned gears, devices mounted on the respective plates and connected with the respective last mentioned gears to cause the latter to move with the respective plates, and springs acting on said plates to resist the movement thereof from said guideway.

10. In a corn cutting machine comprising a guideway and cutters arranged to engage an ear of corn in said guideway, supporting structures mounted on opposite sides of said guideway for movement toward and from said guideway, a pair of rotatable feeding members mounted on each supporting structure, a sprocket wheel connected with each feeding member and arranged above the same, sprocket chains connecting the sprocket wheels of the respective pairs of feeding members, and driving mechanism connected with one feeding member of each pair.

11. In a corn cutting machine comprising a guideway, and cutters arranged to engage an ear of corn in said guideway, supporting structures mounted on opposite sides of said guideway for movement toward and from said guideway, a pair of rotatable feeding members mounted on each supporting structure, a sprocket wheel connected with each feeding member and arranged above the same, sprocket chains connecting the sprocket wheels of the respective pairs of feeding members, a gear connected with one feeding member of each pair and arranged above the sprocket wheel of that feeding member, a shaft, and gears to connect said shaft with the respective first mentioned gears.

12. In a corn cutting machine comprising a guideway and cutters arranged to engage an ear of corn in said guideway, supporting structures mounted on opposite sides of said guideway for movement toward and from said guideway, a pair of rotatable feeding members mounted on each supporting structure, a sprocket wheel connected with each feeding member and arranged above the same, sprocket chains connecting the sprocket wheels of the respective pairs of feeding members, a gear connected with one feeding member of each pair and arranged above the sprocket wheel of that feeding member, a shaft, and gears to connect said shaft with the respective first mentioned gears, the last mentioned gears being mounted for axial movement with relation to said shaft to enable them to move with the respective supporting structures.

13. In a corn cutting machine comprising a guideway and cutters arranged to engage an ear of corn in said guideway, supporting structures mounted on opposite sides of said guideway for movement toward and from said guideway, a pair of rotatable feeding members mounted on each supporting structure, a sprocket wheel connected with each feeding member and arranged above the same, sprocket chains connecting the sprocket wheels of the respective pairs of feeding members, a gear connected with one feeding member of each pair and arranged above the sprocket wheel of that feeding member, a shaft, gears to connect said shaft with the respective first mentioned gears, the last mentioned gears being mounted for axial movement with relation to said shaft to enable them to move with the respective supporting structures, and springs acting on said supporting structure to move said structures and the parts carried thereby toward said guideway.

14. In a corn cutting machine comprising a guideway and cutters arranged to engage an ear of corn in said guideway, supporting structures mounted on opposite sides of said guideway for movement toward and from said guideway, a pair of rotatable feeding members mounted on each supporting structure, a tooth actuating member connected with each feeding member and arranged above the same, means for operatively connecting the actuating members of the respective pairs of feeding members to cause said feeding members to rotate in the same direction, and driving mechanism connected with one feeding member of each pair.

15. In a corn cutting machine, a pair of cutters spaced apart to receive an ear of corn between them, each cutter being curved to extend about said ear and having its cutting edge extending obliquely to the line of movement of said ear, and the two cutters having their adjacent lateral edges spaced one from the other, a set of feeding devices on each side of said cutters to move said ear of corn past the same, means for actuating said feeding devices, a separate supporting structure for each set of feeding devices mounted for bodily movement toward and from said cutters, and means to yieldably resist the movement of said supporting devices and said feeding members from said cutters.

16. In a corn cutting machine, a pair of cutters spaced apart to receive an ear of corn between them, each cutter being curved to extend about the ear and having its cutting edge extending obliquely to the line of movement of said ear, the two cutters having their adjacent lateral edges spaced one from the other, a set of feeding devices on each side of said cutter, having ear engaging parts to move between said cutters and advance said ear of corn, means for actuating said feeding devices, a separate supporting structure for each set of feeding devices mounted for movement toward and from said cutters, and means to yieldably resist the movement of said supporting devices and said feeding members from said cutters.

17. In a corn cutting machine, a pair of cutters spaced apart to receive an ear of corn between them, each cutter being curved to extend about said ear and having its cutting edge extending obliquely to the line of movement of said ear, and the two cutters having their adjacent lateral edges spaced one from the other, feeding devices having parts extending between said cutters and acting on said ear to move the same past said cutters, said feeding devices being movable toward and from said cutters to accommodate them to ears of different sizes, and means for actuating said feeding devices.

18. In a corn cutting machine, a pair of cutters spaced apart to receive an ear of corn between them, curved about longitudinal axes to conform substantially to the shape of the ear and having their adjacent lateral edges spaced one from the other, each cutter having its cutting edge extending obliquely to the line of movement of said ear, and feeding devices having parts extending between said cutters to engage said ear and move the same past said cutters.

19. In a corn cutting machine, a pair of cutters spaced apart to receive an ear of corn between them, each cutter having its cutting edge extending obliquely to the line of movement of said ear, and feeding devices having parts extending between said cutters to engage said ear and move the same past said cutters.

20. In a corn cutting machine comprising a guideway and cutters spaced apart and arranged to engage an ear of corn in said guideway, supporting structures mounted on opposite sides of said guideway for movement toward and from the same, a pair of rotatable feeding members mounted on each supporting structure, one feeding member of each pair having parts arranged to pass between said cutters, a sprocket wheel connected with each feeding member, sprocket chains connecting the sprocket wheels of the respective pairs of feeding members, and driving mechanism connected with one feeding member of each pair.

21. In a corn cutting machine comprising a guideway and cutters spaced apart and arranged to engage an ear of corn in said guideway, supporting structures mounted on the opposite sides of said guideway for movement toward and from the same, a pair of feeding wheels mounted on each supporting structure and so located that the teeth of two of said feeding wheels will pass between said cutters, a sprocket wheel connected with each feeding wheel, sprocket chains connecting the sprocket wheels of the respective pairs of feeding wheels, and driving mechanism connected with one feeding wheel of each pair.

22. In a corn cutting machine comprising a guideway and cutters spaced apart and arranged to engage an ear of corn in said guideway, supporting structures mounted on opposite sides of said guideway for movement toward and from the same, two feeding wheels mounted on each supporting structure, the rear feeding wheel on each supporting structure being arranged to pass between said cutters, a sprocket wheel connected with each feeding wheel, sprocket chain connecting the sprocket wheels of the respective pairs of feeding wheels, and driving mechanism connected with one feeding wheel of each pair.

23. In a corn cutting machine comprising a guideway, cutters arranged to engage an ear of corn in said guideway, a pair of feeding members on each side of said guideway to advance said ear of corn through said guideway and past said cutters, said cutters being arranged between the two rear feeding members, means for actuating said feeding members, and separate supporting members for the respective pairs of feeding members mounted for movement toward and from said guideway, means to yieldably resist the movement of said supporting members from said guideway, and means to limit the movement of said supporting members with relation to said guideway.

24. In a corn cutting machine comprising a guideway and cutters arranged to engage an ear of corn in said guideway, a pair of feeding members on each side of said guideway to advance said ear of corn through said guideway and past said cutters, said cutters being arranged between the two rear feeding members and having their cutting edges oblique to the line of movement of said ear, means for actuating said feeding members, separate supporting members for each pair of feeding members mounted for movement toward and from said guideway, means to yieldably resist the movement of said supporting members from said guideway, means to limit the movement of said supporting members with relation to said guideway, and a conveyor arranged between the two front feeding members, to deliver ears of corn to said feeding members.

25. In a corn cutting machine comprising a guideway, cutters spaced apart and arranged to engage an ear of corn in said guideway, a pair of feeding members arranged on each side of said guideway to advance said ear of corn through said guideway and past said cutters, parts of said feeding members being arranged to pass between said cutters, means for actuating said feeding members, separate supporting members for each pair of feeding members mounted for movement toward and from said guideway, and means to limit the movement of said supporting members with relation to said guideway.

26. In a corn cutting machine having a guideway, a cutter arranged to engage an ear of corn in said guideway, a set of feeding devices on each side of said guideway to advance an ear of corn through said guideway and past said cutter, means for actuating said feeding devices, separate supporting members for the respective sets of feeding devices, each supporting member being so mounted that one end thereof may be adjusted toward and from the other supporting member and the other end thereof will have limited swinging movement toward and from the adjacent end of the other supporting member, and yieldable means to resist the swinging movement of said supporting members one from the other.

27. In a corn cutting machine having a guideway, a cutter arranged to engage an ear of corn in said guideway, supporting members arranged on the respective sides of said guideway, each supporting member being so mounted that one end thereof may be adjusted toward and from the other supporting member and the other end thereof will have limited swinging movement toward and from the adjacent end of the other supporting member, a plurality of feeding members mounted on each supporting member for rotation about individual axes, means to rotate said feeding members, yieldable means to resist the swinging movement of said supporting members one from the other, and means to deliver ears of corn to said feeding members.

28. In a corn cutting machine having a guideway, a cutter arranged to engage an ear of corn in said guideway, supporting members arranged on the respective sides of said guideway, an adjustable bearing for one end of each supporting member about which said supporting member may have limited swinging movement, yieldable means to resist the swinging movement of said supporting members, rotatable feeding devices mounted on the respective supporting members, means to actuate said feeding devices, and means for delivering said ears of corn to said feeding devices.

29. In a corn cutting machine having a guideway, a cutter arranged to engage an ear of corn in said guideway, supporting members arranged on the respective sides of said guideway, an adjustable bearing for the front end of each supporting member about which the rear end of said supporting member may have limited swinging movement, yieldable means to move said supporting members one toward the other, a plurality of toothed feeding devices mounted on each supporting member for movement about individual vertical axes, means for actuating said feeding devices, and a conveyor located in front of and below the level of said feeding devices to deliver ears of corn thereto.

30. In a corn cutting machine, cutters spaced apart, a plurality of rotatable toothed feeding members arranged on each side of the path traversed by an ear of corn delivered to said cutters, means for so supporting said feeding members that each feeding member of each pair will be bodily movable separately from the other feeding member of that pair toward and from the adjacent feeding member of the other pair, under the control of an ear of corn, and the teeth of a part of said feeding members caused to pass between said cutters, means to yieldably press the feeding members toward the path of said ear, and means for rotating said feeding members.

31. In a corn cutting machine, a guideway, a cutter arranged to act on an ear of corn in said guideway, a plurality of substantially flat rotatable feeding members arranged on each side of said guideway, each feeding member being mounted for separate bodily movement transversely to said guideway under the control of an ear of corn in said guideway, means to yieldably press said feeding members toward said guideway, means to rotate said feeding members, and means to deliver ears of corn to said feeding members.

32. In a corn cutting machine, a cutter, a plurality of substantially flat rotatable feeding members arranged horizontally on each side of the path traversed by an ear of corn delivered to said cutter, means for so supporting said feeding members that each feeding member may have separate bodily movement under the control of an ear of corn toward and from the adjacent feeding member on the other side of the path of said member, means to yieldably press said feeding members toward said ear of corn, and means for rotating said feeding members.

33. In a corn cutting machine, a cutter, a plurality of substantially flat rotatable feeding members arranged horizontally on each side of the path traversed by an ear of corn delivered to said cutter, means for so supporting said feeding members that each feeding member may have separate bodily movement under the control of an ear of corn toward and from the opposite feeding member, means to yieldably press said feeding members toward said ear of corn, means for rotating said feeding members, and a feed belt located in front of and below the level of said feeding members to deliver ears of corn to said feeding members.

34. In a corn cutting machine, a cutter, two pairs of substantially flat rotatable feeding members arranged horizontally on the respective sides of the path traversed by an ear of corn delivered to said cutter and cooperating to feed an ear of corn to and past said cutter, means for so supporting said feeding members that each feeding member of one pair may have separate bodily movement under the control of an ear of corn toward and from the adjacent feeding member of the other pair, means to yieldably press said feeding members toward said ear of corn, and means for imparting rotary movement to said feeding members.

In testimony whereof, I affix my signature hereto.

WILLIAM W. MORRAL.